Patented Sept. 18, 1945

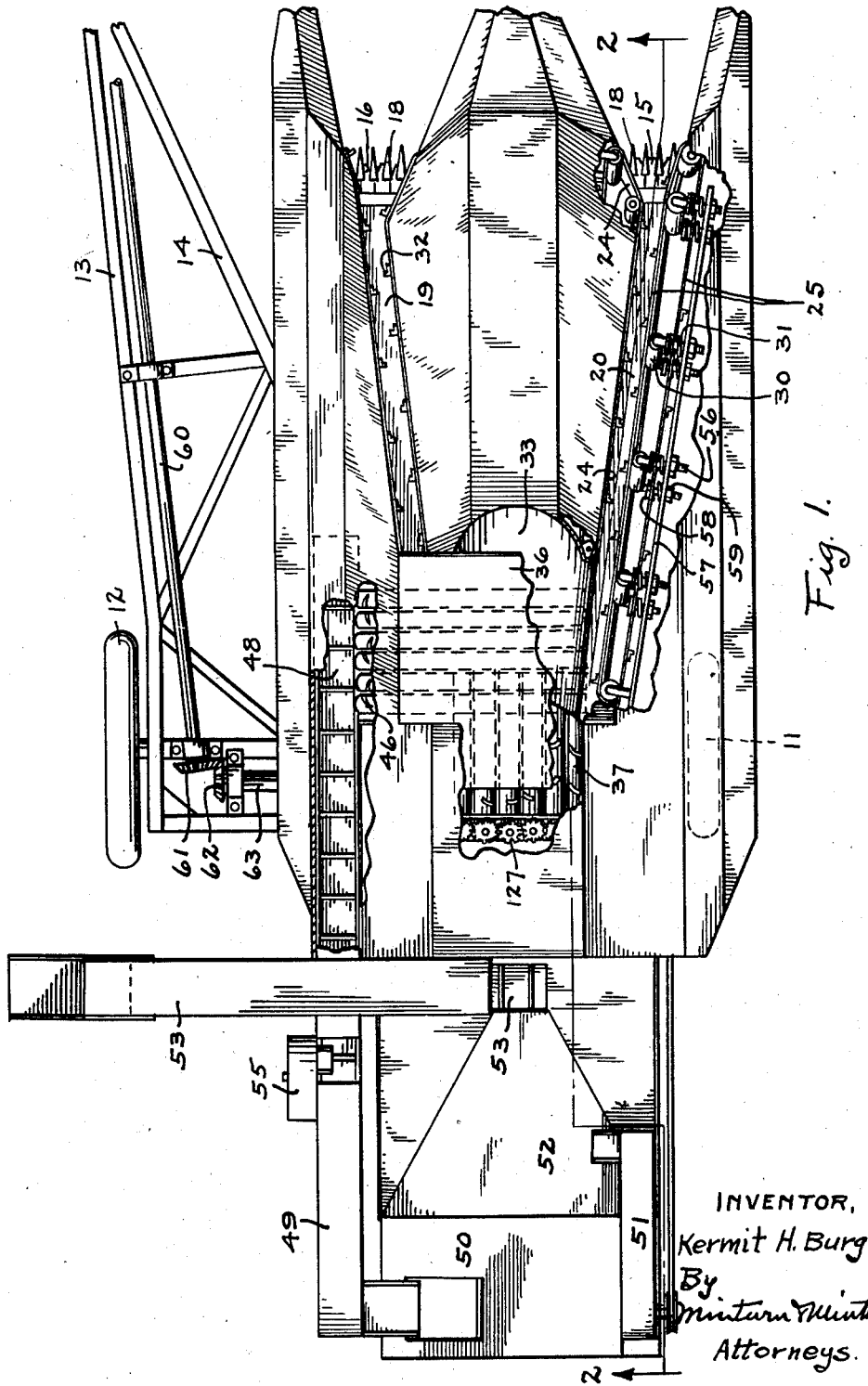

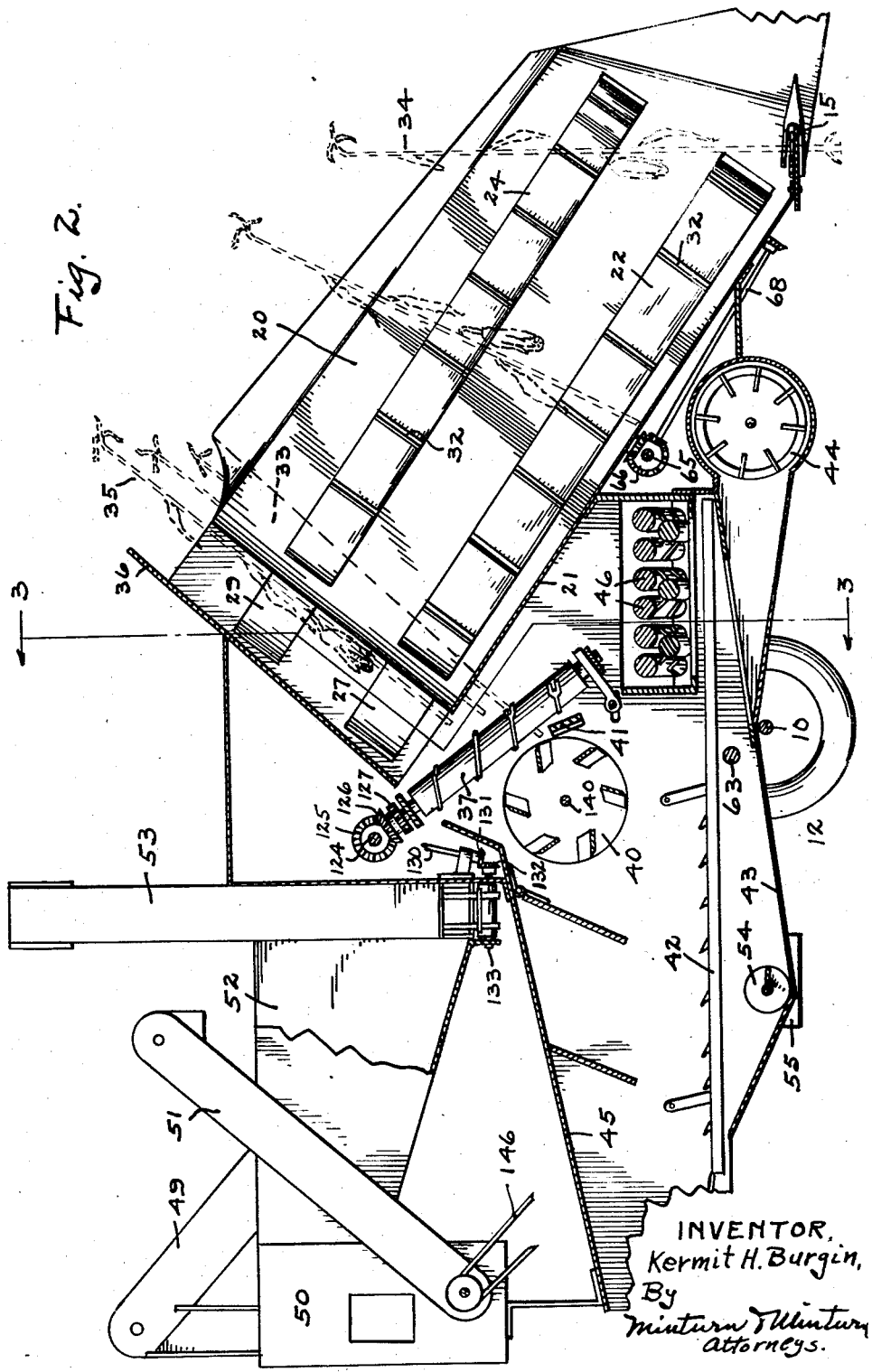

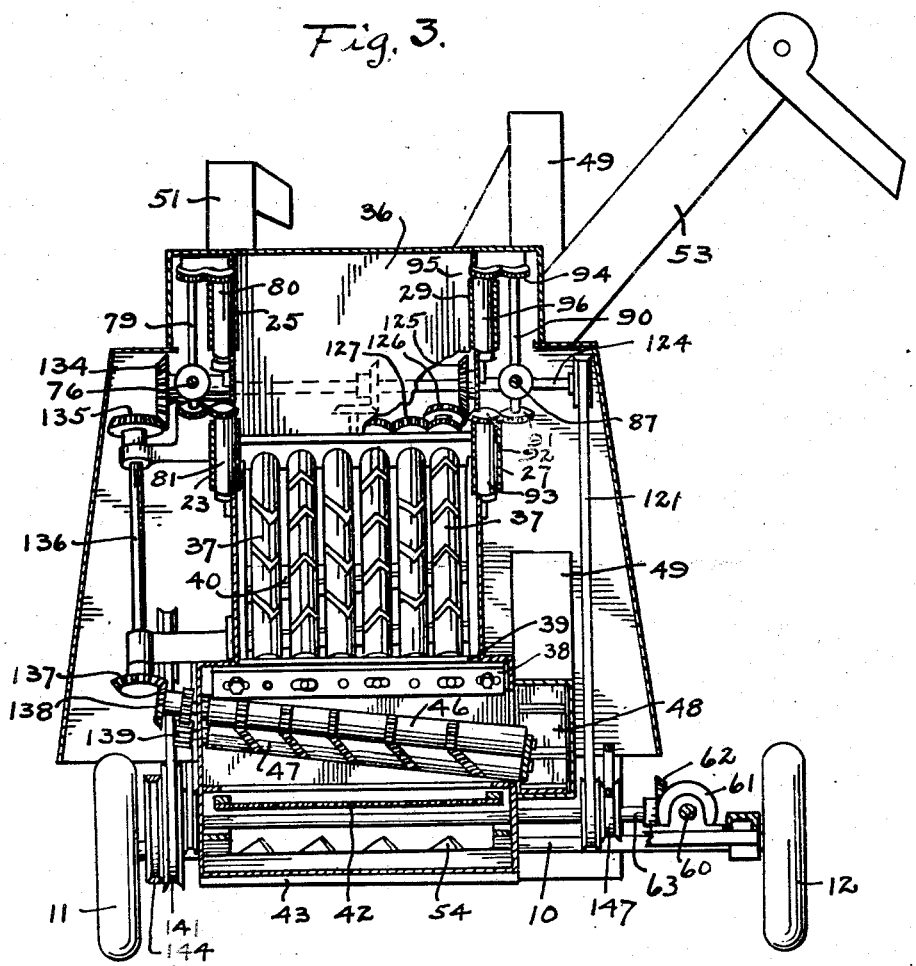

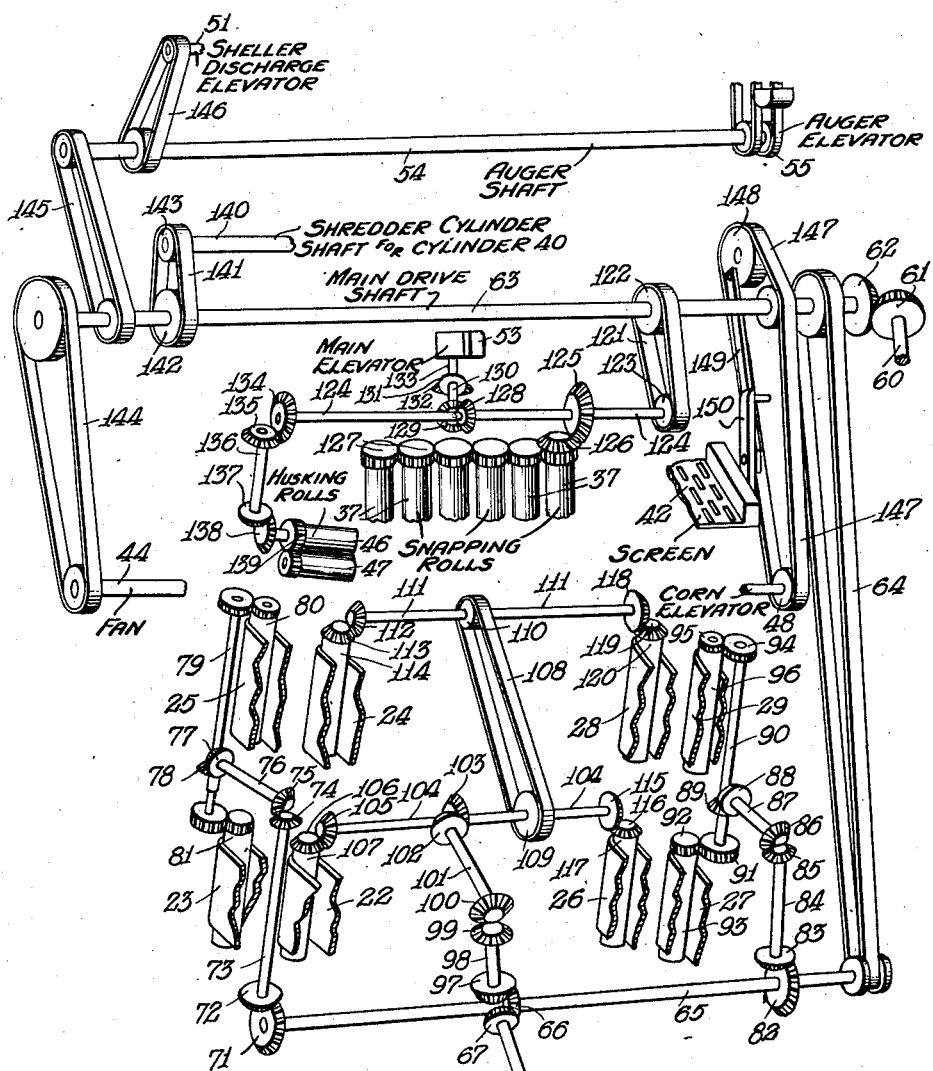

2,385,193

UNITED STATES PATENT OFFICE 2,385,193

CORN AND STALK HARVESTER

Kermit H. Burgin, near Whitestown, Ind.

Application July 28, 1941, Serial No. 404,270

2 Claims. (Cl. 56—66)

This invention relates to means for harvesting field corn, and particularly to means for separating the corn either in the ear or shelled form from standing stalks, and cutting or shredding the stalks to place them in a condition for either spreading back onto the ground or for collecting or baling for subsequent use for feeding, bedding, or industrial uses.

A primary object of the invention is to provide a mechanism which may be operated directly in the corn field to accomplish the above indicated general purposes simply by moving the mechanism along the corn rows. Incorporated in this mechanism to aid in accomplishing the above indicated general purposes are the important objects of successfully gathering the standing corn stalks; moving them into the mechanism to have the ears snapped from the stalks; passing the stalks through a cutting or shredding device; carrying the shredded or cut up stalks into a common direction of discharge from the mechanism; husking the snapped ears; and then selectively delivering the husked ears or shelled corn from those ears to either a collecting hopper or bin or a wagon operated along the side of the mechanism.

Corn harvesting devices have heretofore been limited to the usual corn pickers wherein the ears were snapped from the standing stalks, which stalks were left with their lower ends attached to the ground and their upper ends more or less broken over, but in any event leaving the entire stalk in the field. Generally the stalk was left in such a condition that it was extremely difficult to plow it under or to break it off, particularly when the corn ground was sowed in wheat. With the advent of the corn borer in increasing numbers it becomes necessary to combat this pest by completely disposing of the corn stalks before springtime in order to destroy the larvae hibernating in the stalk through the winter.

The present invention has been designed with the thought in mind of completely shredding the corn stalks or chopping them into small particles so that when such stalks are returned onto the ground from the present device instead of being baled or otherwise hauled off, the small particles of stalks lying upon the ground may be completely turned under in the ordinary plowing operations.

It has long been recognized that corn stalks have a commercial value by reason of the fact that many desirable products may be made therefrom including gas, paper, and many other usable products. The difficulty has been heretofore in harvesting the corn stalks within a reasonable cost. By use of my invention, the corn stalks are made readily available at the time the corn itself is harvested, all in the one operation over the field. The foregoing objects of the invention are accomplished by a mechanism that is relatively simple in form and simple in operation. The mechanism may be incorporated in a portable unit, as herein described, that may be readily operated by the usual and well known farm tractor in much the same manner that the common combine is now used in harvesting small grain, such as wheat, oats, and soy beans.

Many other important objects and advantages of the invention, as achieved in the various new and novel arrangements of structural details in the mechanism, will become apparent to those versed in the art in the following description of one particular form of mechanism embodying the invention as more or less diagrammatically illustrated in the accompanying drawings, in which Fig. 1 is a top plan view of a structure embodying the invention;

Fig. 2, a view in longitudinal vertical section on the line 2—2 in Fig. 1;

Fig. 3, a view in vertical transverse section on the line 3—3 in Fig. 2; and

Fig. 4, a diagrammatic representation of the driving system for operating the various members of the mechanism.

Like characters of reference indicate like parts throughout the several views in the drawings.

While the invention may assume various forms and may be mounted on any number of desired wheels, for simplification, a structure is herein described and illustrated as being carried upon one main axle 10 extending transversely across the device and about which the entire mechanism may be rocked in order to vary the height at which corn stalks are cut. Furthermore, for simplification in illustrating the invention, no means is shown for rocking the device about the axle since such means is old in the art and does not constitute invention per se in the present instance. The axle 10 is supported by two wheels 11 and 12 preferably having pneumatic tires as is the present practice. The mechanism, in the present particular form, is drawn across the field by the customary farm tractor through a hitch consisting of the frame members 13 and 14, Fig. 1, provided to one side of the mechanism.

While the structure may be designed and built to handle one row of corn at a time, it is herein shown as designed to handle two rows of corn.

To this end mowing sickles 15 and 16 are provided, each spaced one from the other horizontally a distance permitting them to be reciprocated to cut off the standing corn stalks. In practice these sickles will be raised and lowered in relation to the ground in order to take care of ground conditions, such as rough or smooth ground, but most importantly to permit the sickles to be operated as near the ground as possible in order to cut off the stalks and leave an extremely short stub, which stub generally is below that point in the corn stalk where corn borers hibernate. In any event the short stub may be readily plowed under to be completely covered over with dirt. The sickles 15 and 16 are herein shown as being on a common sickle bar 17, Fig. 4, and are operated in the usual manner with guards 18 extending forwardly thereof.

The machine is designed to have V-like openings entering from the forward end thereof at the rear end of which are the respective sickles 15 and 16, these openings corresponding generally to those employed in the heretofore common and well known corn pickers. The object, of course, of the V-shape of these openings is to guide the corn which may be leaning or down toward the respective sickles.

Leading rearwardly from these two openings are slot-like passageways 19 and 20 respectively, herein shown as being directed inwardly toward the center line of the machine. These slots 19 and 20 serve as means through which the cut off corn stalks are carried rearwardly and upwardly into the machine for subsequent operations. While the undersides of these passageways 19 and 20 may be left open or even be provided with a conveyor belt as a floor, these passageways are herein shown as being provided with a solid floor 21, Fig. 2, inclined upwardly and rearwardly.

It is essential that in each of these passageways there be means employed for engagement with the standing stalks whereby the stalks may be conveyed rearwardly and upwardly along these passageways without falling over or becoming lodged therein. To this end, each side of the passageway, passageway 20 for example, is slotted and provided with a lower conveyor chain or belt extending through the slot, herein shown as a belt 22 on one side and 23 on the other side; and a similar upper conveyor chain or belt 24 on the one side and 25 on the other side. These belts, as indicated in Fig. 1, are preferably extended into the passageway 20 but are yieldingly retractable therefrom also as indicated in Fig. 1 in reference to the belt 25. The forward ends of these belts are spread apart while the major portions of the opposing faces of the respective belts are substantially parallel. These belts are driven in each instance to have their opposing faces along and within the passageway running toward the rear end of the passageway. In the same manner, Fig. 4, the passageway 19 has the two spaced apart lower belts 26 and 27 and the two upper spaced apart belts 28 and 29 operating in the same manner and same direction. It is to be understood that the side walls of the passageways 19 and 20 are substantially closed, being made, in one particular form, out of sheet metal, and that all of the conveyor belts operate through slots provided in these respective walls. Thus the corn stalks may be conveyed by the respective belts.

Referring again to the belt 25, Fig. 1, the major length of the side of the belt along the passageway 20 is yieldingly backed up by a number of rollers 30 normally held in outer positions by the springs 31. The same arrangement is employed on each of the other belts. The purpose of these yielding backing up rollers 30 is to permit the opposing belts to spread apart when a bunch of corn may be carried therebetween so that a compressive grip may be had on the corn stalks being carried up the passageway in each instance between the respective belts. The belts are further provided with some positive corn stalk engaging means, herein shown as slats or ribs 32 fixed transversely across the respective belts. The exact form of these stalk engaging members 32 does not form a part of the invention per se although some projection from the conveyor belts is desirable to prevent slippage of the stalks therealong.

At the upper ends of the passageways 19 and 20 is provided therebetween a stalk receiving receptacle 33. In the form herein shown this receptacle 33 consists essentially of a concave trough sloping downwardly and rearwardly, open at both the upper and lower ends thereof. The inclination of the floor of the receptacle 33 is preferably less than forty-five degrees from the vertical as measured from the top side of the receptacle at its lower end, the essential angle of inclination being that which will readily permit the corn stalks deposited on the floor thereof to slide freely by gravity downwardly thereover.

In the travel of a single stalk 34, Fig. 2, wherein the stalk is indicated in dash lines, when the sickle 15, for example, cuts off the stalk, the upper portion of the stalk is positioned between the upper belts 24 and 25 but has not yet been brought between the lower belts 22 and 23 by reason of the fact that the upper belts have their forward ends carried around rollers positioned ahead of similar rollers about which the lower belts 22 and 23 travel. This arrangement provides for initial engagement of the stalk at a position therealong well above the lower end thereof so that the stalk has no tendency to tip forwardly out of the entrance into the passageway 20. Then as the machine progresses along the row of corn stalks, the lower end of the stalk passes relatively between the forward ends of the lower belts 22 and 23 to be progressively engaged therebetween. Because the central receiving receptacle 33, as above indicated, is inclined downwardly and rearwardly from the vertical, and since the stalks 34 are initially substantially vertically aligned when entering the machine, it is desirable to change this upright alignment of the stalks to some such alignment as will be parallel with the floor of the receptacle 33. To accomplish this realigning of the corn stalks, the lower belts 22 and 23, in reference to the passageway 20, are operated at a slightly higher lineal rate of speed than are the upper belts 24 and 25. This difference in speed will carry the lower ends of the stalks 34 up through the passageway 20 a trifle faster than that portion of the stalks engaged between the upper belts 24 and 25 and thereby change the positions of the upwardly carried stalks 34 from the initial vertical position to an eventually inclined position as indicated by the stalk 35, Fig. 2, whereby that stalk 35 may drop down into the receptacle 33 without any substantial tilting or rocking, all to the end that one stalk after another comes into the receptacle 33 in parallel alignment without any appreciable criss-cross effect. As above indicated, the stalks carrying the ears are engaged between the upper and lower pairs of belts for positive travel thereby.

In short, means are provided in the description thus far given to cut off the corn stalks carrying the ears and then convey them upwardly and deposit them in more or less parallel alignment in a receptacle, from which the stalks may readily slide downwardly under the influence of gravity. To prevent any undue flopping about of the stalks as they leave the passageways 19 and 20 and drop into the receptacle 33, a cover board 36 is provided to extend transversely across the receptacle 33 and on across each of the passageways 19 and 20. The discharge openings from the passageways 19 and 20, as indicated in Figs. 1 and 2, are from the inner side walls thereof, the belts along the outer walls of those passageways being continued on up across the openings.

Extending across forwardly and downwardly below the lower end of the receptacle 33 are a plurality of snapping rolls 37 preferably having their upper ends inclined from the vertical in the neighborhood of forty-five degrees as measured from the underside of the rolls although this angle may be changed, of course, in relation to the angle of the floor of the receptacle 33. The relative angle between the snapping rolls 37 and the floor of the receptacle 33 may be varied by adjusting the angularity of the rolls 37. The variation may become necessary in changing from dry to damp corn stalks. In any event the snapping rollers 37, herein shown as six in number, are so positioned that the lower ends of the corn stalks dropping downwardly from the receptacle 33 are engaged between respective pairs of these rollers 37 to be pulled on therebetween. Furthermore the rolls 37 are so located in reference to the floor of the receptacle 33 that stalks of corn coming from the receptacle will feed between the rolls 37 substantially within a range therealong between the upper and central portions of the rolls. As indicated in Fig. 2, where three separate stalks are shown in the receptacle 33, the first stalk deposited in that receptacle will first slide downwardly; a second stalk deposited in the receptacle will be on top of the first one and have its lower end spaced above the butt end of the first stalk, and so on with subsequently deposited stalks. In practice, of course, instead of one stalk at a time being deposited in the receptacle 33, there will be a number of stalks forming in effect one layer over a lower layer of stalks, each layer arranged as indicated by single stalks in Fig. 2. This means that by reason of the peculiar construction employed, the stalks are delivered into the receptacle 33 to be positioned one layer over another in substantially the manner of forming a shingle roof. This means that the under stalks each have their butt ends initially presented to the snapping rolls 37 with the weight of a mass of overlying stalks thereover. This weight of the upperlying stalks holds the underlying stalks in position on the floor of the receptacle 33 as the butt ends of the underlying stalks are engaged and pulled downwardly between the rolls 37, thus bringing into engagement with those rolls the next above overlying stalks. This simple expedient is very effective in causing the corn stalks to feed properly to the snapping rolls 37.

The rolls 37 may have any of the well known and commonly used surface configurations for the purpose of adequately snapping the ears from the stalks, and therefore the exact type of roll employed for this purpose does not form a part of the present invention per se. These rolls ordinarily are made to be adjustable as to spacing therebetween, one form of adjustment being indicated in Fig. 3 where the first, second, and third rolls (from left to right) have their lower bearings fixed in a bar 38 that may be shifted in relation to a fixed bar 39 that carries the bearings of the second, fourth and sixth rollers, the particular means of adjusting likewise not forming a part of the present invention per se.

As the stalks are carried on through between the snapping rolls 37, the ears, of course, are snapped or pulled from those stalks to slide on down under the influence of gravity from the forward sides of those rolls. The stalks themselves as they travel between the rolls 37 come into contact with some means for cutting or shredding them. In the present form such means is represented by a rapidly revolving cylinder 40 carrying cutter knives about its periphery to have their edges adjacent a shear bar 41 over which the stalks are cut or shredded depending, of course, upon the shape of the cutter or shredder knives of the cylinder 40. In any event the shredded or cut stalk portions drop downwardly onto a shaker screen 42 which is constantly reciprocated fore and aft of the machine in order to separate grains of corn from the cut stalks or fodder. The grains drop through the screen into a catch pan 43 while the stalk particles are carried on toward the rear end of the machine aided by a blast of air from a fan 44 discharging rearwardly and upwardly through the screen 42. The fodder is confined within the shaker screen chamber between the side walls thereof and the roof 45 and the only opening therefrom for escape of the cut up fodder is at the rear end which, in the present showing, is left open to permit the finely divided fodder to drop directly onto the ground. It is obvious, of course, that delivery may be made from this discharge opening directly into a wagon pulled along with the machine or directly into some baling device of the present and well known type but not herein shown. Thus the stalks are finally disposed of in their finely divided state.

Going back to the snapping rolls 37, the ears still carrying their husks drop downwardly from the front sides of the rolls 37 onto some suitable husking means. In the form herein shown, the husking means comprises a plurality of shucking rolls 46, herein shown as six in number (three pairs) and having suitable projections and indentations about their surfaces to engage and pull off the husks from the ears of corn. Where simple shucking of the corn is desired without immediate shelling at this point, these rolls 46 are sufficient, the shucks being carried on downwardly therebetween to discharge directly onto the shaker screen 42 to be carried outwardly with the fodder. It is, of course, conceivable that when so desired a shuck cutting cylinder (not shown) may be employed under these rolls for cutting up the shucks, but in the majority of cases by the time the shucks have passed between the rolls 46, they are sufficiently torn up as to present no problem even when spread directly upon the ground.

The shucking rolls 46 may, if desired, be employed to not only shuck the corn but to shell it from the cobs in which case not only the shucks but also the shelled corn and the cobs themselves are pulled on downwardly between the rolls, the cobs being broken up in passing therebetween, so that all of the corn is then dropped onto the forward end of the shaker screen 42 in which case the floor 43 would be extended directly upwardly thereunder. In order to accomplish this direct shelling action, the rolls 46 would preferably be supplemented by additional under rolls 47, herein shown as one for each pair of rolls 46. In this construction, the rolls 46 would be spaced further apart than when normally used for simple shucking operations so that the ears would be gripped between the rolls 46 for the shelling operation. In any event the rolls 46 and their supplementary rolls 47 would preferably be adjustable as to spacing therebetween, the adjusting means being any one of the well known and commonly used types for adjustment of similar rolls and therefore not herein shown.

Assuming that the ears are simply shucked and not shelled by the rolls 46, the ears are delivered from the lower left-hand end of the rolls 46 directly into some suitable conveying means. It is to be noted, particularly as is shown in Fig. 3, that these rolls 46 are inclined downwardly from their upper right-hand ends to their lower left-hand ends in order to facilitate and promote delivery of the ears therefrom.

The conveying means receiving the ears from the roller 46 consists in the present form of the invention of an endless conveyor belt 48 carried in the housing 49 along the left-hand side of the machine to discharge at an upper end preferably into a sheller unit 50. This sheller unit may be of any one of the conventional forms to shell the grains of corn from the cobs and deliver the shelled grain through a conveyor 51 into a hopper 52. The cobs from the sheller would be dropped directly onto the ground in a majority of cases or may be dropped into the discharged cut up fodder for collection therewith. From the hopper 52 leads a conveyor 53 which may be continuously or selectively operated to carry the shelled grain from the hopper 52 to one side of the machine for discharge into a truck or wagon.

That part of the grain which may drop directly downwardly from the snapping rolls 37 and also all of the grain which may be shelled by the rolls 46 and 47 passes eventually through the shaker screen 42 onto the floor 43 as above indicated. The floor 43 is sufficiently inclined to a central transverse zone as to permit the grains to slide by gravity into that zone. A conveyor of any suitable type, such as an auger 54, is mounted to extend across that zone and be driven in the proper direction to carry the grain across the floor 43 into a conveyor 55 on the left-hand side of the machine which lifts the shelled grain and discharges it onto the upwardly traveling belt 48 whereby that shelled grain may be carried into the unit 50 which in this case would be used simply as a cleaner without any shelling operation so that clean grain would then be carried therefrom into the hopper 52.

Referring again to Fig. 1, and particularly to the conveyor belt 25 in the passageway 20, the rollers 30 are in effect carried upon U-bolts 56, with the free ends of the bolts 56 passing through a supporting wall 57. Between the wall 57 and suitable stops 58, one on each leg of the bolt 56, is positioned the spring 31. The ends of the bolts 56 are preferably screw-threaded to carry nuts 59 thereon to serve as adjustably positioned stops limiting the travel of the rollers 30 away from the wall 57 into the passageway 20. In the present form, the return side of the belt 25 passes between the legs of the bolts 56. As above indicated, while the belt is thus shown as being yieldingly extended through the side wall of the passageway 20 by this one particular means, the essential feature is that the belt be presented within the passageway in such manner that it, in combination with the opposing belt on the other side of the passageway, will yieldingly grip the stalks therebetween. While the one belt 25 has thus been described with this yielding means, preferably all four of the belts presented in each of the two passageways 19 and 20 are thus mounted. This yielding arrangement is of particular advantage when the ears of corn themselves may be engaged between the opposing belts, under which circumstances, of course, an additional spacing between the belts is desirable to prevent shelling of the ears and yet to maintain a sufficient grip on the stalks as will carry them along through the passageways.

Reference to Fig. 4 will disclose a schematic diagram of the driving system employed in the mechanism in the one form above described. In this form, the input power is delivered through the main drive shaft 60 which in the usual situation connects with the tractor power take-off, although, of course, a separate engine unit may be employed, mounted directly on the frame of the present machine. In any event the power drive is taken up in turn from the shaft 60 through suitable bevel gears 61 and 62 to drive the transverse shaft 63. From this shaft extends a power drive, herein shown as in the form of a belt 64 (a V-belt preferably) to drive a forward transverse shaft 65 which extends across the machine under the floors 21 of the passageways 19 and 20. Through suitable means, such as the bevel gears 66 and 67, a shaft 68 extending forwardly and downwardly is driven thereby. The forward end of the shaft 68 is suitably interconnected to drive a crank member 69 which in turn drives the pitman 70 that is in turn pivotally connected to the sickle bar 17 as a means for reciprocably driving the sickles 15 and 16.

All of the various stalk conveying belts presented in the passageways 19 and 20 are driven from this shaft 65 in the present instance. For example, the belts 23 and 25 are driven from the gear 71 fixed on the shaft 65, the intermeshing gear 72, the upright shaft 73, the gear 74 on the shaft 73, the intermeshed gear 75 on the shaft 76, driving a gear 77 which is in mesh with a gear 78 on a final drive shaft 79 that interconnects through suitable spur gears with the upper and lower belt drive rollers 80 and 81 respectively, the gearing therebetween being suitably arranged to provide for the higher rate of speed of the roll 81 as compared to the speed of the roll 80. This takes care of the drive of the upper and lower belts 25 and 23 presented in the outer wall of the passageway 20. In the same manner the conveyor belts 27 and 29 in the outer wall of the passageway 19 are driven beginning with a bevel gear 82 fixed on the shaft 65; a gear 83 meshed with the gear 82 and fixed on the upright shaft 84; a gear 85 fixed on the shaft 84 and meshed with the gear 86 fixed on the shaft 87; the gear 88 fixed on the other end of the shaft 87 and meshing with a gear 89 on the upright shaft 90; spur gear 91 fixed on the lower end of the shaft 90 and meshing with the spur gear 92 fixed on the roller 93 around which the belt 27 wraps for driving connection; the spur gear 94 fixed on the upper end of the shaft 90 meshing with the spur gear 95 fixed on the roll 96 around which the upper belt 29 wraps for its driving connection; the ratio between the gears 91 and 92 being varied from the ratio between the gears 94 and 95 to permit the more rapid driving of the roll 93 as compared to the roll 96.

The belt conveyors 22 and 24 presented along the inner wall of the passageway 20 are driven by means of a gear 97 meshed with the gear 66 and fixed to the shaft 98 on which in turn is fixed the gear 99 meshing with the gear 100 that is in turn fixed to the shaft 101; the gear 102 fixed to the shaft 101 and meshing with the gear 103 fixed to the shaft 104; the gear 105 fixed on one end of the shaft 104 and meshing with the gear 106 carried by the drive roll 107 about which the lower belt 22 wraps for driving connection; the belt 108 (preferably a V-belt) driven by the pulley 109 fixed on the shaft 104 and driving the pulley 110 fixed on the upper shaft 111; the gear 112 fixed on the shaft 111 and meshing with the gear 113 on the roll 114 about which the belt 24 wraps for driving engagement. In similar manner the belts 26 and 28 presented along the inner wall of the passageway 19 are driven by means of a gear 115 fixed on the shaft 104 and meshing with the gear 116 on the roll 117 about which the belt 26 wraps for driving engagement; gear 118 on the end of the shaft 111 meshing with the gear 119 on the roll 120 about which the upper belt 28 wraps for driving engagement.

The snapping rolls 37 are herein shown as being driven by a belt 121 between the pulley 122 on the shaft 63 and the pulley 123 on the shaft 124; a gear 125 on the shaft 124 meshing with a miter gear 126 on one of the rolls 37; and each of the rolls 37 driven one from the other through suitable spur gears 127, one on each of the rolls 37. The main discharge elevator 53 is also driven from this shaft 124 by suitable interconnecting drive means, such as the miter gear 128 on the shaft 124 meshing with the miter gear 129 on the shaft 130 that extends downwardly to carry the lower miter gear 131 that in turn meshes with the miter gear 132 on the lower drive pulley shaft 133 of the conveyor mechanism.

From this same shaft 124 are driven the shucking rolls 46, and when employed, the supplementary rolls 47, by the bevel gear 134 fixed on the shaft 124 and meshing with the gear 135 fixed on the shaft 136; the bevel gear 137 likewise fixed on the shaft 136 and meshing with a miter gear 138 fixed on one of the rolls 46; and finally through the usual spur gears 139, one on each roller 46 and 47 constantly intermeshed.

The shredder or cutter cylinder shaft 140 on which the cylinder 40 is mounted is driven directly from the main cross driving shaft 63 by any suitable means, such as the belt 141 wrapped about the pulleys 142 on the shaft 63 and 143 on the shaft 140. The fan 44 is also driven from the shaft 63 by means of the belt 144 extending around suitable pulleys mounted on the respective drive shaft 63 and the shaft of the fan 44. The auger 54 is also driven from the shaft 63 by means of a belt 145 and the discharge elevator 51 as well as the elevator 55 are both driven from the augur shaft 54, the elevator 51 by means of a suitable belt 146, and the elevator 55 by having its conveyor driven directly thereby.

The grain elevator belt 48 is driven from the shaft 63 by means of the belt 147. The same belt 147 also drives the crank disc 148 from which extends a pitman 149 to one of the supporting arms 150 of the shaker screen 42 whereby the screen is given its reciprocatory motion.

Thus it is to be seen that I have provided a relatively simple structure sufficiently compact and in which the various elements are so associated one with the other that very effective harvesting of corn may be had with the simultaneous handling of the stalks. While the invention has herein been shown and described in the one particular form, it is obvious that many structural variations may be employed, such, for example, as in the particular construction of the stalk conveying means through the incoming passageways, specific snapping and shucking roll constructions; and specific driving means and connections between the various elements, all without departing from the spirit of the invention, and I therefore do not desire to be limited to that precise form beyond the limitations as may be imposed by the following claims.

I claim:

1. In a corn harvesting machine, the combination with stalk severing means, of conveying belt means spaced above the severing means to engage opposing sides of corn stalks; conveying belt means spaced below said engaging means to engage lower portions of the corn stalks; said first engaging means extending forwardly of the second and lower engaging means; and means driving said first engaging means at a slower rate of speed than that of said second engaging means; whereby a severed corn stalk is tilted forwardly while engaged and held by both of said engaging means and conveyed therebetween; each of said upper and lower conveying means comprising a pair of opposing belts; and means permitting one belt in each pair to retract yieldingly between ends thereof to provide yielding gripping of the corn stalks between the belts of each of said pairs, said means comprising spaced apart rollers individually spring pressed against the stalk gripping sections of the belts whereby localized zones of those sections may retract independently of other zones thereof.

2. In a standing corn harvester having a rearwardly and downwardly sloping stalk receiving wall and a forward stalk cutting means spaced ahead of the wall, the combination of a chute between said wall and said cutting means; a rearwardly travelling belt conveyor along a side of said chute having its forward end located to contact the lower portion of a stalk upon severance by said cutting means; a second rearwardly travelling belt conveyer along a side of said chute above said first conveyer and having a forward end portion spaced above and ahead of the forward portion of said first conveyer to contact a stalk initially above its zone of contact with the first conveyer; and means driving said second conveyer at a slower speed than that of said first conveyer; and a plurality of spaced apart rollers individually spring pressed against said upper stalk contacting belt to provide localized retractible zones along the belt whereby a stalk may be initially gripped and pulled rearwardly by the upper conveying means while being cut off by said severing means and then the stalk being gripped at a lower portion by the lower conveyer, and subsequently carried back to fall on said wall.

KERMIT H. BURGIN.